Patented July 4, 1944

2,353,016

UNITED STATES PATENT OFFICE 2,353,016

PHYSIOLOGICALLY ACTIVE SUBSTANCE

Paul J. Daughenbaugh, Wrightstown, Pa., assignor to Sharp & Dohme, Incorporated, Philadelphia, Pa., a corporation of Maryland No Drawing. Application January 9, 1940,
Serial No. 313,054

10 Claims. (Cl. 167—74)

This invention relates to physiologically-active preparations comprising a product chemically derived from animal materials such as tissues and particularly to a protein-free, nitrogenous, physiologically-active product chemically derived from such animal materials, especially from the pancreas and similar tissues, which product is free from physiologically significant quantities of insulin, histamine and acetylcholine and practically free of toxic elements which may be manifested by heart-block.

The preparations of this invention have valuable physiological uses and are especially adapted for treatment of human ailments. They manifest unusual utility in their applicability to relieve the pain or cramp associated with intermittent claudication. In using them, it has been found possible to inject the preparations of the effective product intravenously to bring about peripheral dilatation particularly without toxic reactions. It has been especially noted that the injection of these preparations in therapeutic doses is not accompanied by any pain and that their administration in such doses is strikingly non-toxic.

In addition to the above noted outstanding properties of the preparations of the invention, they also have been found to cause a transitory lowering of the systemic blood pressure, to dilate the capillaries of the peripheral vascular system and to reduce the concentration of fatty substances such as cholesterol and lecithin in the blood stream.

The essential physiologically-active product of the preparations covered by this invention may be chemically derived from animal materials, for example, animal tissues such as the pancreas, kidney, ovaries, and the like, and may be obtainable to some degree from other animal materials. They may be readily derived from an animal material, such as animal tissue, advantageously the pancreas, by steps involving particularly treating the material with strong alcohol so as to maintain, in the treatment of the material, an alcohol content advantageously at about 97% or over and a pH between about 4.8 and about 5.2 and preferably around pH 5, chilling and filtering the mixture and removing substantially all of the alcohol from the filtrate, suitably by vacuum distillation, chilling the alcohol-free residue and filtering it to remove insoluble extraneous matter such as fats and tissue sludge. The resulting filtrate is the desired physiologically-active product. It is protein-free, nitrogenous and free of physiologically significant quantities of insulin, histamine and acetylcholine, and practically free of toxic principles which may be manifested by heart-block.

The above described steps employed in obtaining the physiologically-active product of the invention are followed as the basic steps of a substantially complete process when it is desired to obtain the physiologically-active product as the product initially sought to be derived from the animal material. However, in some cases the animal material may be a source for some other physiologically-active principles (such as insulin derived for example from the pancreas) differing in character and physiological activity from the product of this invention, and it may be desirable to first process the animal material to initially remove such other physiologically-active principle such as insulin before continuing the treatment required to derive the physiologically-active product of this invention. In such cases the above described process steps are required to complete the treatment necessary for the derivation of the product of the instant invention.

Thus the essential physiologically-active product may be regularly derived from animal materials by methods, including the steps hereinabove generally outlined, exemplified by but not limited to the following:

Method I

The physiologically-active product of this invention is directly obtained by the following procedure as the initial product sought to be derived from the animal material such as the pancreas. According to this method it is possible to avoid extracting from the pancreas or other tissue, insulin which would interfere with the physiological activity of the product covered by the invention.

To fresh or suitably refrigerated pancreas, conveniently beef pancreas, preferably macerated, sufficient absolute alcohol is added to produce a mixture having an alcohol content of about 97% or over. The hydrogen-ion concentration is adjusted to about pH 5, although it may vary between about 4.8 and 5.2, if desired, with a suitable acid such as a mineral acid as hydrochloric or sulfuric acid. The mixture may be suitably agitated. Sufficient absolute alcohol is periodically added to maintain the alcohol concentration at about 97%. These conditions are continued for a sufficient time, for example, about 48 hours. The mixture is then chilled and filtered to yield a clear alcoholic filtrate, the volume of which then is reduced by vacuum distillation (for removal of the alcohol) to about one-tenth the original volume. To avoid the difficulty accompanying a constant boiling mixture, sufficient water is then added to double this first reduced volume and the vacuum distillation is continued to remove substantially all of the alcohol. (In these steps to remove the alcohol by vacuum distillation, it is possible to start, for example, with an initial total volume of 200 gallons and to reduce that volume during the distillation to about 20 gallons before the addition of sufficient water to avoid the constant boiling mixture and then to increase the volume by the water addition to about 40 gallons which volume upon continuation of the vacuum distillation can be reduced to possibly one-half gallon.) With the alcohol thus removed the aqueous residue of the vacuum distillation is chilled to around −10° C. and filtered to remove insoluble matter as fats and tissue sludge. The aqueous filtrate is the desired effective physiologically-active product.

The effective physiologically-active product thus derived may be made ready for use as a therapeutic preparation for administration by injection or other desirable method by suitable dilution in a saline solution to any desired standard and preferably accompanied by adjustment of the hydrogen-ion concentration to between about pH 6.4 and about pH 6.8 and particularly about pH 6.5, or by other convenient means.

Method II

A second method of producing the preparations containing the essential physiologically-active product of the invention is illustrated by the treatment of an animal substance such as beef pancreas by steps which include the prior removal of the insulin content of the starting material followed by subsequent treatment of the residue to derive the desired product from it.

According to this method, 100 pounds of finely ground and minced beef pancreas is added to 36 gallons of 90% alcohol containing 1200 cc. of hydrochloric acid in a suitable extraction tank and is allowed to stand, preferably with continual agitation, for about two hours and then permitted to settle over night. The settled mixture is then centrifuged to separate the tissue from the mixture. To increase the yield of insulin, where it is particularly sought, this tissue is then re-extracted with 70% alcohol in a volume equal to that of the first filtrate obtained from the centrifuge and is similarly centrifuged, the second filtrate being added to the first. Sufficient ammonia is added to the mixed filtrates to adjust the pH to from about 7.8 to about 8.0. The resulting precipitate (designated alkali soluble proteins) is separated by filtration. The filtrate is acidified with sufficient dilute sulfuric acid to adjust the hydrogen-ion concentration to about pH 3.6–3.8 and is then vacuum distilled to remove the alcohol, the temperature during the distillation being maintained preferably below 30° C. to avoid destroying the insulin. The distillation is continued until the volume of solution in the still is equivalent to about one-eighth of the original volume. The remaining aqueous solution from the still is heated to 50° C. and its hydrogen-ion concentration adjusted, if necessary, to between pH 2.0 and pH 2.4, and it is then filtered to remove fat and other residue. The fat-freed filtrate is then cooled to about 30° C. and substantially saturated with sodium chloride to precipitate the proteins, during which precipitation it is desirable that the mixture be permitted to stand about two hours at the end of which time the saturated sodium chloride liquor is drawn off, the precipitated proteins remaining behind being set aside for other use.

The clarified sodium chloride extract thus obtained is adjusted with 5-normal sodium hydroxide to a hydrogen-ion concentration of about pH 6.5 and is then concentrated by vacuum distillation to about one-quarter of its original volume to remove as much as possible of the sodium chloride. Ordinarily it is advantageous to combine the clarified sodium chloride extracts from several batches to start the vacuum distillation concentration, for example, with a total initial volume of 180 gallons and then to continue the reduction in volume to about 45 gallons, during which the greater portion of the sodium chloride crystallizes out. The concentrated sodium chloride suspension is removed, preferably to glass-lined jars, and sufficient anhydrous alcohol is added, preferably with stirring, to give a 95% alcohol content. Removal of additional sodium chloride is effected by refrigerating the alcohol suspension preferably at −10° C. for about two to four days and then filtering the suspension preferably at −10° C.

The filtrate obtained after the refrigeration is then vacuum distilled to remove alcohol and its volume is reduced to 20 gallons or less (based on the starting volume of 180 gallons) and its hydrogen-ion concentration is adjusted to pH 6.5 with 5-normal sodium hydroxide in a suitable vessel, and sufficient anhydrous alcohol is added, preferably while stirring, to adjust the alcohol content to 97%, whereupon a thick, dark precipitate forms. The 97% alcohol solution containing the precipitate is then refrigerated, preferably at −10° C. and for from two to four days during which there is an increase to a substantial quantity of the thick, dark, oily to gummy or wax-like precipitate. The mixture is filtered preferably at −10° C. The 97% alcoholic filtrate is vacuum distilled to remove the alcohol and if necessary to avoid the difficulty associated with a constantly boiling mixture, this distillation is carried on until the volume of material is reduced to about 6 to 8 gallons (based on the starting volume of 180 gallons), after which 20 gallons of distilled water are added and the distillation continued to reduce the volume of liquor to about 8 to 10 gallons (on the same basis).

The resultant aqueous concentrate obtained after thus removing the alcohol by vacuum distillation is the physiologically-active product of the invention in usable, although in somewhat crude, form. In this form it is available for use as the essential physiologically-active ingredient of preparations suitable for administration for the treatment of human ailments. For many purposes, some further refinement may be made. Thus this concentrate from the vacuum distillation may be adjusted with a suitable alkali such as 5-normal sodium hydroxide to pH 6.5. The concentrate may then advantageously be refrigerated to 5° C. and clarified by passing it through a Seitz clarifying pad, preferably while maintaining its temperature at 5° C. The effective physiologically-active product contained in the clarified concentrate may be worked up into administration preparations of any desired form or composition for various applicable purposes. At this stage, for example, a preparation suitably adapted for the various uses to which the preparations of the invention are applicable including the relief of pain or cramp associated with intermittent claudication, is obtained by diluting the clarified and sterilized concentrate so that it contains approximately 2.5% solids including about 0.25% of non-protein nitrogen and about 0.9% of sodium chloride, and adding a preservative, for example 0.25% phenol. Such preparation has a hydrogen-ion concentration of about pH 6.5.

In some cases instead of adjusting the alcohol strength to 97%, as in the initial alcohol treatment mixture employed in Method I or in the final alcohol treatment after the removal of the proteins and substantially all of the salt in Method II, it is possible to carry out the treatment with an alcohol content maintained above about 92% and preferably above about 95%. In such cases, however, in order to obtain an ultimate end product adequately free of toxic elements which may be manifested by heart-block, before the step involving the removal of the alcohol by vacuum distillation, it is necessary to adjust the alcohol content to about 97% or over, whereupon a thick, dark precipitate forms. This 97% alcohol solution containing the precipitate is then refrigerated, preferably at −10° C., and for from two to four days, and then filtered preferably at −10° C. and the filtrate subjected to the vacuum distillation for the removal of the alcohol.

The concentration of the desired end product obtained by any variation of the basic method may vary in accordance with the specific type of animal material or with the grade of any specific tissue employed as the starting material, and from batch to batch of any specific material used as starting material as a result of any variations in the relative volumes of materials at the various stages of the method of production. However, irrespective of the concentration of any end product obtained, the effective physiologically-active product may be standardized by suitable dilution so that 1 cubic centimeter of the solution will produce in dogs an average lowering in arterial blood pressure equivalent to the lowering of the blood pressure produced by a standard preparation.

In the appending claims the expression "animal materials" is employed broadly as including the animal material in substantially the original composition in which it was obtained from the animal, that is, without its having been subjected to some procedure to remove from it some desired physiologically-active principle or substance, as well as in the condition in which such animal material may be available after it has been carried through a procedure for the prior removal from it of some other physiologically-active principle or substance, as referred to at page 1, column 2, lines 11 to 21 hereof. The expression "pancreas tissue" in some of the appending claims is likewise used broadly in the same sense.

While the invention may have been illustrated by certain specific embodiments, it is understood that suitable changes, modifications, and equivalents may be employed without departing from the scope of the invention as covered in the appending claims.

I claim:

1. A physiologically-active preparation applicable to the treatment of human ailments, comprising an alcohol soluble and readily water soluble, protein-free, nitrogenous product soluble in saline solutions up to saline saturation and chemically derived from animal materials capable of yielding said product, which preparation is free of physiologically significant quantities of insulin, histamine and acetylcholine and practically free of toxic principles which may be manifested by heart-block, said product containing approximately 2.5% solids including about 0.25% non-protein nitrogen and about 0.9% of sodium chloride and being capable of causing a transitory lowering of the systemic blood pressure, of causing dilatation of the capillaries of the peripheral vascular system, of relieving the pain or cramp associated with intermittent claudication.

2. A physiologically-active preparation applicable to the treatment of human ailments, comprising an alcohol soluble and readily water soluble, protein-free, nitrogenous product soluble in saline solutions up to saline saturation and free of physiologically significant quantities of insulin, histamine and acetylcholine and practically free of toxic principles which may be manifested by heart-block, which product is chemically derived from animal materials capable of yielding said ingredient, said ingredient being capable of causing a transitory lowering of the systemic blood pressure, of causing dilatation of the capillaries of the peripheral vascular system, of relieving the pain or cramp associated with intermittent claudication.

3. A physiologically-active preparation applicable to the treatment of human ailments, comprising an alcohol soluble and readily water soluble, protein-free, nitrogenous product soluble in saline solutions up to saline saturation and free of physiologically significant quantities of insulin, histamine and acetylcholine and practically free of toxic principles which may be manifested by heart-block, which product is chemically derived from animal tissues capable of yielding said ingredient, said ingredient being capable of causing a transitory lowering of the systemic blood pressure, of causing dilatation of the capillaries of the peripheral vascular system, of relieving the pain or cramp associated with intermittent claudication.

4. A physiologically-active preparation applicable to the treatment of human ailments, comprising an alcohol soluble and readily water soluble, protein-free, nitrogenous product soluble in saline solutions up to saline saturation and free of physiologically significant quantities of insulin, histamine and acetylcholine and practically free of toxic principles which may be manifested by heart-block, which product is chemically derived from the pancreas, said ingredient being capable of causing a transitory lowering of the systemic blood pressure, of causing dilatation of the capillaries of the peripheral vascular system, of relieving the pain or cramp associated with intermittent claudication.

5. A substance useful in the treatment of human ailments having the properties of the physiologically-active, alcohol soluble and readily water soluble, protein-free, nitrogenous product soluble in saline solutions up to saline saturation and chemically derived from the pancreas, which product is free of physiologically significant quantities of insulin, histamine and acetylcholine and practically free of toxic principles which may be manifested by heart-block, said product being capable of causing a transitory lowering of the systemic blood pressure, of causing dilatation of the capillaries of the peripheral vascular system, of relieving the pain or cramp associated with intermittent claudication.

6. In the process of chemically deriving an alcohol soluble and readily water soluble, protein-free, nitrogenous product soluble in saline solutions up to saline saturation and free of physiologically significant quantities of insulin, histamine and acetylcholine and practically free of toxic principles which may be manifested by heart-block, said product being capable of causing a transitory lowering of the systemic blood pressure, of causing dilatation of the capillaries of the peripheral vascular system, and of relieving the pain or cramp associated with intermittent claudication, from animal material as the starting substance, the combination of steps which comprises keeping said starting substance under acid conditions for a sufficient time to disconjugate the product and also treating the material with sufficient strong alcohol to maintain in the treatment an alcohol content of at least about 97%.

7. In the process of chemically deriving an alcohol soluble and readily water soluble, protein-free, nitrogenous product soluble in saline solutions up to saline saturation and free of physiologically significant quantities of insulin, histamine and acetylcholine and practically free of toxic principles which may be manifested by heart-block, said product being capable of causing a transitory lowering of the systemic blood pressure, of causing dilatation of the capillaries of the peripheral vascular system, and of relieving the pain or cramp associated with intermittent claudication, from animal material as the starting substance, the combination of steps which comprises treating said substances under acid conditions with strong alcohol to maintain, in the treatment of the material, an alcohol content of at least about 97%, and a hydrogen-ion concentration between about pH 4.8 and about pH 6.5.

8. In the combination of steps in the process as in claim 7, maintaining a hydrogen-ion concentration between about pH 4.8 and about pH 5.2.

9. In the process of chemically deriving an alcohol soluble and readily water soluble, protein-free, nitrogenous product soluble in saline solutions up to saline saturation and free of physiologically significant quantities of insulin, histamine and acetylcholine and practically free of toxic principles which may be manifested by heart-block, said product being capable of causing a transitory lowering of the systemic blood pressure, of causing dilatation of the capillaries of the peripheral vascular system, and of relieving the pain or cramp associated with intermittent claudication from animal material as the starting substance, the combination of steps which comprises treating said substance under acid conditions with strong alcohol to maintain, in the treatment of the material, an alcohol content of at least about 97% and a hydrogen-ion concentration between about pH 4.8 and about pH 6.5, chilling the mixture and removing the solids therefrom, then removing substantially all of the alcohol from the filtrate and removing insoluble, extraneous matter obtained by chilling the alcohol-free filtrate.

10. In the combination of steps in the process as in claim 9, employing a pancreas material as the starting material.

PAUL J. DAUGHENBAUGH.